June 15, 1937.  T. C. CRENSHAW  2,084,132
DIRECTION SIGNAL CONTROL
Filed May 22, 1936  2 Sheets-Sheet 1
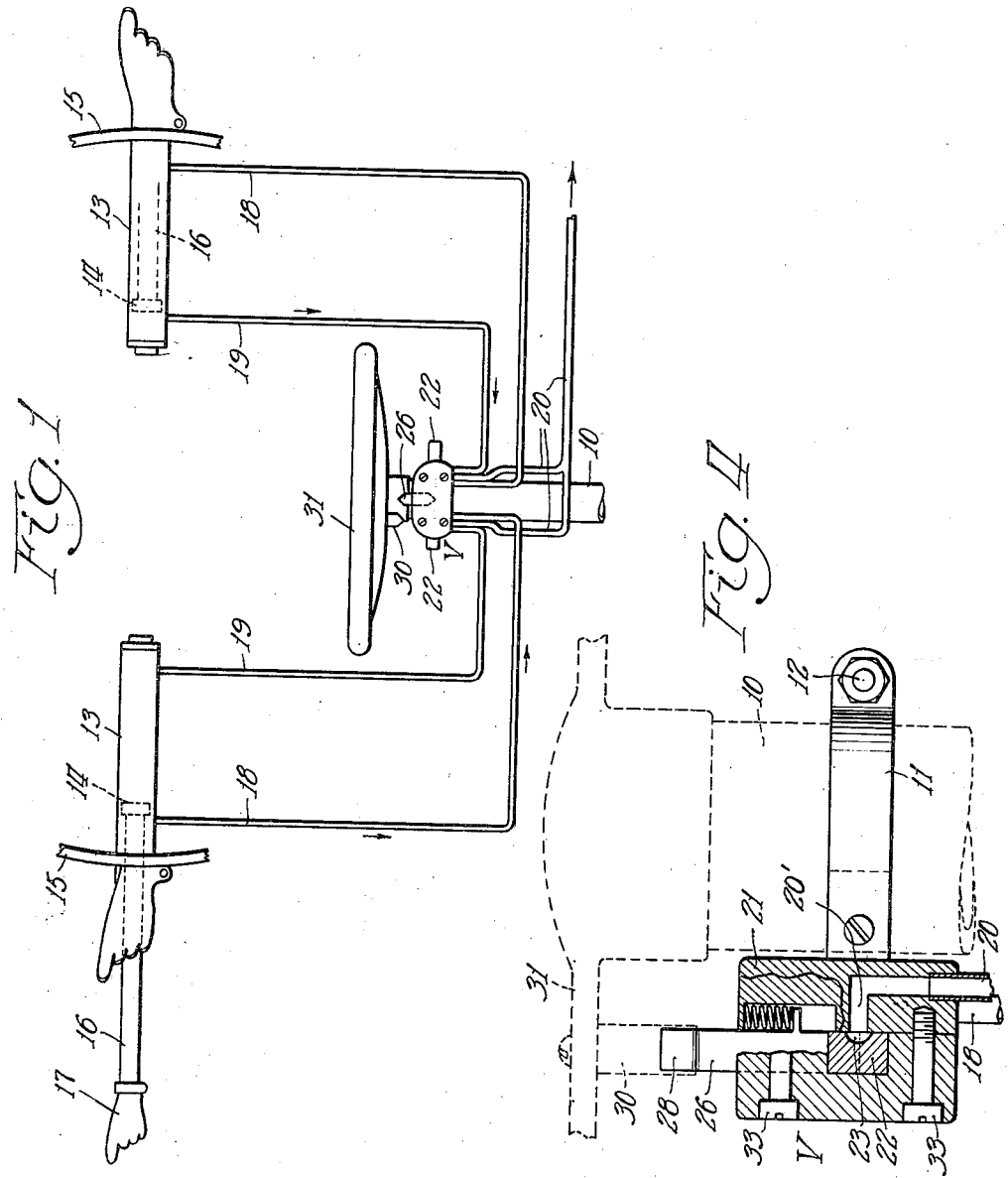
Inventor:
Thomas C. Crenshaw
By: C.P. Soper
Atty.

June 15, 1937. T. C. CRENSHAW 2,084,132
DIRECTION SIGNAL CONTROL
Filed May 22, 1936 2 Sheets-Sheet 2
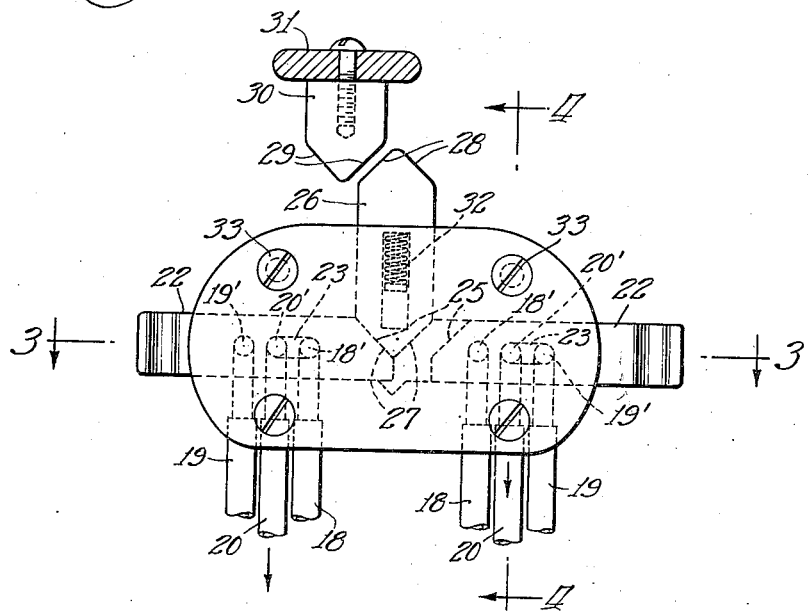
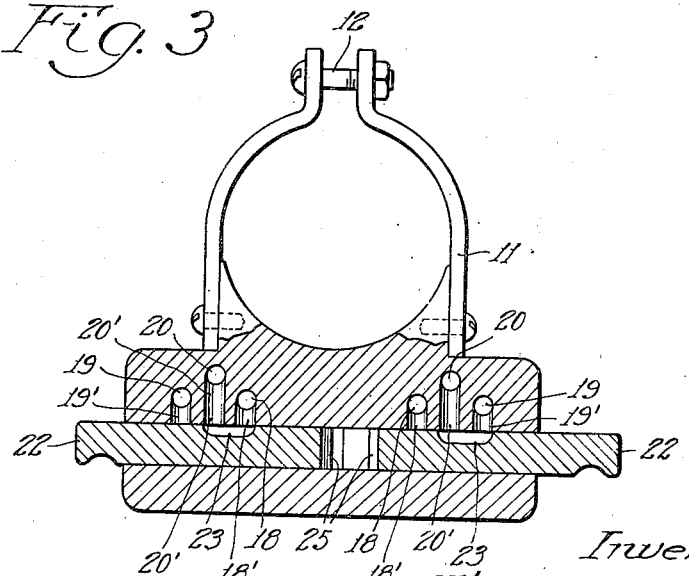
Inventor:
Thomas C. Crenshaw Patented June 15, 1937

2,084,132

UNITED STATES PATENT OFFICE 2,084,132

DIRECTION SIGNAL CONTROL

Thomas C. Crenshaw, Chicago, Ill.

Application May 22, 1936, Serial No. 81,234

4 Claims. (Cl. 116—36)

This invention relates to improvements in direction signal controls and particularly to signaling devices such as are employed on motor vehicles, to convey to drivers of other cars and also pedestrians that the driver of the automobile equipped with the present invention intends to change the direction of travel of the car, and whether a left turn or a right turn is contemplated.

The present invention is intended for use with a pneumatically operated direction signal and relates particularly to the valve mechanism, located within easy reach of the driver, by means of which the signal operating member may be joined to a source of vacuum or gas under pressure. The valve herein disclosed, is adapted for use with a direction signal such as disclosed in Patent 1,836,705, granted to B. A. Crenshaw, December 15, 1931, although its use is not limited to direction signals of this particular type. A signal entirely different in detail may be employed and air pressure may be substituted for vacuum, as an operating means by a perfectly obvious reversal of the pipes or tubes leading from the source of power to the valve mechanism. Obviously, if the signal is to be operated by air pressure, the power should be applied thereto oppositely to how it is applied when the signal is operated by suction or vacuum.

An object of the invention is the provision of an improved valve for controlling the operation of a direction signal of the type under consideration.

One of the features of the invention is the provision of a valve mechanism which can readily be mounted on the steering post of a car adjacent to the steering wheel together with valve actuating mechanism which may be operated by the driver to indicate a turn by a simple manual act which will not require the driver to divert his or her attention from the business of operating the car.

Another feature of the invention resides in the provision of means whereby the direction signal will be returned to normal by the process of making the turn, yet will in no way interfere with the manual restoration to normal of the controlling valve. In the present invention the automatic restoring means consists of a cam-like element carried by the steering wheel and adapted, when the wheel is rotated, to engage a cooperating element associated with the valve mechanism fixed with the steering post so as to restore the valve to normal in which position the signal is inoperative.

Before giving a detailed description of the device a brief general description of its operation will be given. Two vacuum actuating members as disclosed in the above noted patent will preferably be provided. The controlling valve of the present invention will consist of two practically separate valve devices each adapted to be controlled by a sliding bar or movable valve member. Associated with the sliding valve members is a cam-like device which, whenever either of the valve devices is in a position to cause operation of its direction signal, is projected into the path of a cam member carried by the steering wheel. Thus, as a driver approaches a point at which a turn is contemplated, the appropriate sliding valve member is pushed inwardly to cause the operation of the signal device to indicate the direction of turn contemplated. The act of pushing a sliding valve member inwardly brings it into engagement with a cam member associated therewith and, as a turn of the vehicle is made, a second cam on the steering wheel will actuate the first cam member to restore the previously operated sliding valve member to normal, causing the signal to be effaced.

It is believed the further disclosure of the invention will be understood most readily from a detailed description thereof taken in connection with the accompanying drawings in which Fig. 1 is a view of the valve mechanism as seen from the driver's seat and also shows, schematically, the signal mechanism of the above noted patent associated therewith;

Fig. 2 is a similar view, somewhat enlarged, of the valve mechanism;

Fig. 3 is a section substantially on the line 3—3 of Fig. 2, looking in the direction of the arrows; and Fig. 4 is a section substantially on the line 4—4 of Fig. 2 looking in the direction of the arrows.

Referring now to the drawings in which like reference characters indicate like parts in the several views, 10 indicates the steering post of a motor vehicle to which is secured by means of the clamping members 11 and bolt 12 the valve mechanism generally indicated by the character V in each of the figures of the drawings.

Referring to Fig. 1, 13 represents cylinders, each having a piston 14 slidable therein. At 15 are disclosed portions of the cowl. To each piston is attached a rod 16 which carries, at the end thereof, a signal 17 in the form of a glass hand-shaped device with a pointing forefinger. Within the glass hand is a bulb adapted to be illuminated whenever the hand is extended as fully described in the above noted patent.

Communicating with each of the cylinders 13, adjacent to the opposite ends thereof, are the pipes or tubes. The purpose of the valve herein described is to join the several tubes 18 and 19 selectively to the tube 20 which communicates with the intake manifold of the motor.

Referring now to Fig. 1 and particularly to Fig. 2, it will be noted that the vacuum tube 20 extends to each of the separate valve devices and that a pair of tubes 18 and 19 also extend to each valve device. The tubes 18, 19 and 20 terminate in perforations in the block 21 as shown in Fig. 3. Slidable within the block 21 are the sliding valve members 22 each of which is provided with a depression or cut-out portion 23. Drills 18', 19' and 20', see Fig. 3, in the block 21 form extensions of the tubes 18, 19 and 20, respectively. These drills extend to the face of the block 21 adjacent to slides 22. In Fig. 3 the slide 22, at the left, has been pushed inwardly and in this position tube 18 is connected to the vacuum tube 20 through the medium of the recess 23 in the slide 22. Thus suction is applied to the outer end of the cylinder 13 at the left in Fig. 1, and the signal hand 17 will be extended to indicate a left turn as shown in Fig. 1.

When, however, a valve slide 22 is in its outer position, as shown at the right in Fig. 3, the vacuum tube 20 will be joined to the tube 19 which communicates with the inner end of its respective cylinder 13. Thus when it is desired to efface a signal 17 the corresponding valve slide 22 will be moved to its outermost position. It is apparent that this operation may be readily accomplished manually by grasping the projecting end of the valve slide 22 and pulling it outwardly.

While an actuated valve slide may be returned to normal manually it has been found desirable to provide means for automatically restoring an actuated valve slide and thus effacing a displayed signal.

The means for automatically restoring a displayed signal will now be described. Referring to Fig. 2 it will be noted that the adjacent ends of the valve slides 22 have the upper corners removed so as to provide inclined or tapered cam-like surfaces 25. Slidably mounted in the block 21 is a block 26 which is pointed at each end as clearly shown in the drawings. The cam surfaces 27 at the lower end of the sliding block 26 are adapted to engage the cam surfaces 25 of the valve slides 22, respectively. The cam surfaces 28 at the upper end of block 26 are adapted to be engaged by the cam surfaces 29 of the cam block 30 which is fixed to the steering wheel 31 in any desired manner. A mild spring 32 may be provided to normally urge the block 26 upwardly so it will not interfere with the manual inward movement of the valve slides 22.

Referring to Fig. 4 it will be noted that applicant preferably forms the block 21 of two parts secured together by the screws 33 in order to facilitate the formation of the channels and drills therein.

It will now be seen that a driver contemplating a turn will push inwardly one of the valve slides 22. If a right turn is contemplated, the right slide 22 will be actuated. This will join the suction tube 20 to the tube 18 at the right in Fig. 1, causing the piston 14 to move to the right end of cylinder 12 and display the right signal 17. As the wheel 31 is turned in making the turn the surface 29 of block 30 carried by the wheel will engage the cam surface 28 of the sliding member 26 and force member 26 downwardly. One of the cam surfaces 27 at the lower end of the member 26 will engage the cam surface 25 of the actuated valve slide 22 and move it outwardly into the position of the member 22, at right in Fig. 2. This will join the vacuum tube 20 to the tube 19 which communicates with the inner end of the right cylinder 13 and the actuated signal will be drawn inwardly and effaced.

The structure of the signal mechanism has been but briefly described herein. For a more complete description thereof reference may be made to the above noted patent.

From the above description it will be evident that applicant has devised a direction signal controlling device which may be set to operative or indicating position by an easy manual operation of mechanism conveniently located and which will be restored to its normal position automatically by the process of making the turn. It will also be obvious that the automatic means in no ways interfere with the manual effacement of the signal at any time.

It is obvious that many changes may be made in the details of construction without departing from the spirit of the invention. The invention, should therefore, be limited only by the scope of the appended claims.

I claim:

1. In a self-propelled vehicle, including a steering mechanism and a directional signal, a control means for said signal comprising oppositely slidable control members for selective actuation to set said signal to indicate a direction of turn of the vehicle, a cam member having normally inclined surfaces disposed between said control means for cooperation therewith, and a second cam member operable with the steering mechanism and cooperative with the inclined surfaces of the first named cam member, said control members and the first named cam member having opposed inclined co-acting surfaces to return an actuated control member to normal for the effacement of a respective signal indication upon the operation of the steering mechanism in making the turn.

2. The control means as set forth in claim 1, and the first named cam has rectilinear motion at right angles to the control members and a resilient means is provided to support the first named cam member in operative position relative to said control members and said second cam member.

3. In a self-propelled vehicle, including a steering mechanism and a vacuum-operated directional signal, a control mechanism for said signal comprising oppositely movable valve members for selectively setting said signal to indicate a direction of turn of the vehicle, a cam member having normally tapered surfaces disposed between said valve members for cooperation therewith, and a second cam member operable from the steering mechanism and cooperative with the tapered surfaces of the first named cam member, said valve members and the first-named cam member having opposed tapered surfaces co-acting to return an actuated valve member to normal for the effacement of a respective signal indication upon the operation of the steering mechanism in making the turn.

4. The signal control mechanism as set forth in claim 3, and a spring means for the first named cam member to support it in operative position relative to said valve members and said second cam member.

THOMAS C. CRENSHAW.